Figure 1:
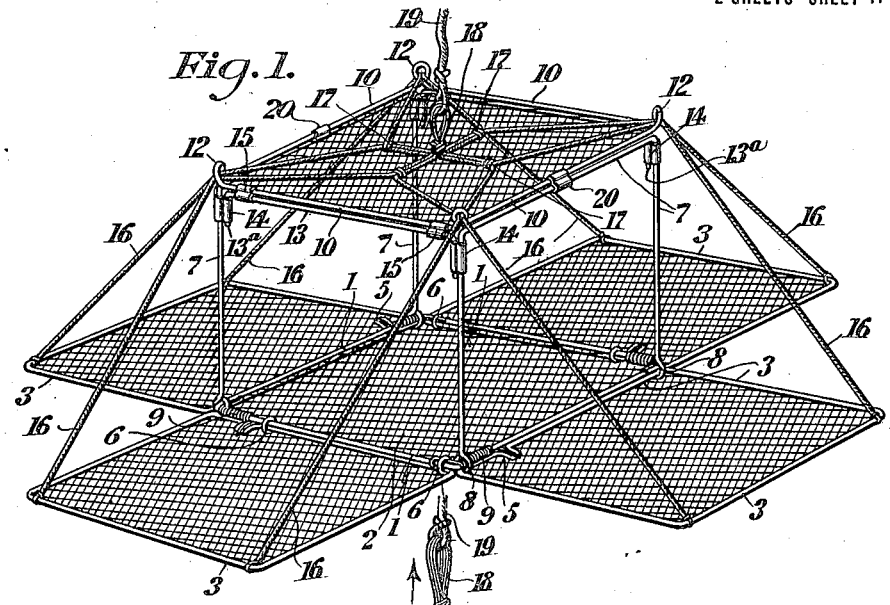

J. F. MASEK, DEC'D.
K. MASEK, ADMINISTRATRIX.
COLLAPSIBLE TRAP.
APPLICATION FILED OCT. 15, 1920.

1,383,992.

Patented July 5, 1921.

2 SHEETS—SHEET 1.

Inventor
John F. Masek
By Davis & Davis
his Attorneys.

J. F. MASEK, DEC'D.
K. MASEK, ADMINISTRATRIX.
COLLAPSIBLE TRAP.
APPLICATION FILED OCT. 15, 1920.
1,383,992.
Patented July 5, 1921.
2 SHEETS—SHEET 2.
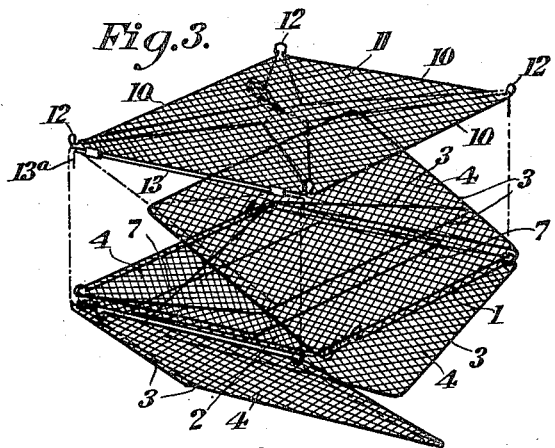
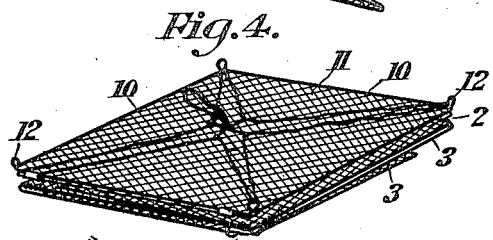
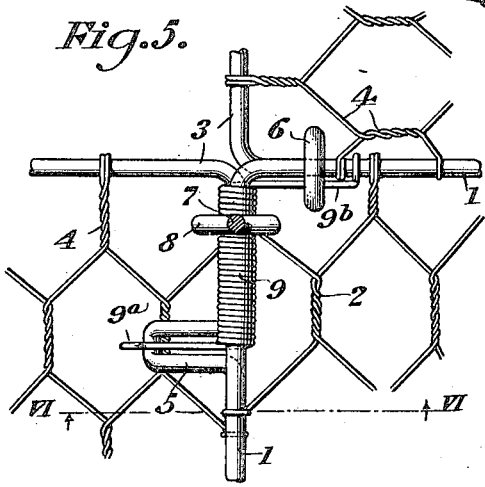
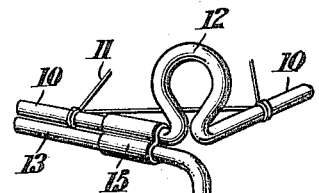
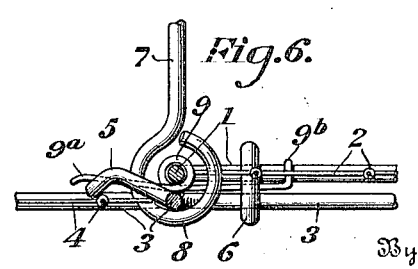
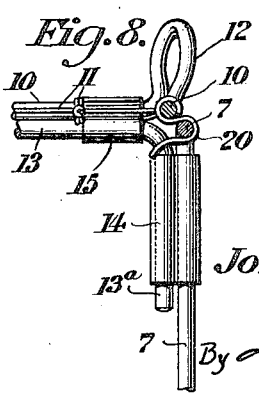
Inventor
John F. Masek
By Daniel Davis
his Attorneys.

UNITED STATES PATENT OFFICE.

JOHN F. MASEK, OF NEW YORK, N. Y.; KAROLINA MASEK, ADMINISTRATRIX OF SAID JOHN F. MASEK, DECEASED, ASSIGNOR TO JOSEPH HOLOUBEK, OF NEW YORK, N. Y.

COLLAPSIBLE TRAP.

1,383,992.      Specification of Letters Patent.      Patented July 5, 1921.

Application filed October 15, 1920. Serial No. 417,149.

*To all whom it may concern:*

Be it known that I, JOHN F. MASEK, a citizen of the United States, and resident of the borough of Manhattan, in the city, county, and State of New York, have invented certain new and useful Improvements in Collapsible Traps, of which the following is a specification.

This invention relates to improvements in traps for catching crabs, lobsters, or the like, and has for one of its objects to provide a simple and efficient portable box-like trap which may be readily collapsed to form a compact flat package.

Further objects of the invention are to provide a box-like trap having its four vertical side walls hinged to its bottom wall to swing up and down to close and open the trap, and to provide simple collapsible means for rigidly holding the top and bottom walls of the trap in their normal relation, said means being so constructed as to interpose practically no obstruction to the passage of crabs or the like into the trap when the side walls are swung open.

Figure 2:
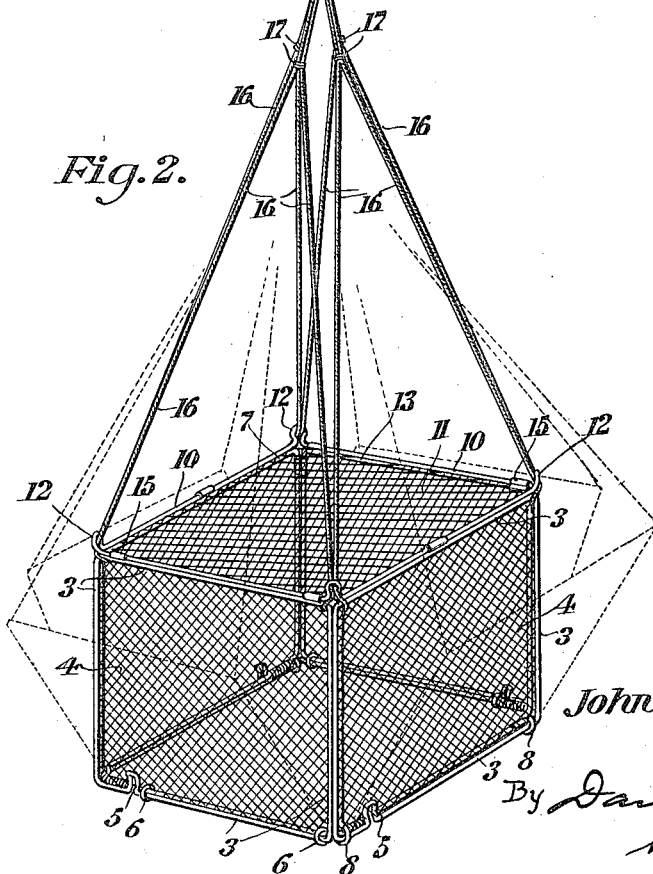

In the drawings:

Figure 1 is a perspective view of the trap in open position;

Fig. 2 a perspective view of the closed trap;

Fig. 3 a perspective view of the trap partly collapsed;

Fig. 4 a perspective view of the trap collapsed;

Fig. 5 a detail view showing the connections between the side and bottom walls of the trap at one corner of the bottom wall;

Fig. 6 a vertical section on the line VI—VI of Fig. 5; and

Figs. 7 and 8 detail views showing one of the separable connections between the parts of the collapsible skeleton support for the top wall of the trap.

The bottom wall of the trap consists of a rigid rectangular wire frame 1 covered by a suitable open mesh wire fabric or netting 2. Each of the four vertical side walls of the trap comprises a rigid rectangular wire frame 3 covered by a wire netting 4, that portion of the wire forming the lower side of the frame being bent adjacent one vertical edge of the frame to form a U-shaped rock arm or abutment 5 extending toward the upper side of the frame.

Two oppositely disposed frames 3 are hinged at their lower sides to the adjacent sides of the frame 1, each of said two frames 3 being pivotally held to frame 1 by a pair of wire rings or annular hinge members 6. The other two frames 3 and two oppositely disposed bails 7 are hinged to the other two sides of frame 1, preferably by common pivotal connections comprising eyes 8 formed on the lower ends of the side arms of the bails and loosely embracing the adjacent sides of the frames 1 and 3.

The top wall of the trap consists of a rectangular wire frame 10 covered by an open mesh wire fabric or netting 11, the wire forming frame 10 being bent or crimped at the corners of the frame to form four upstanding cord-guiding eyes or loops 12. The top wall of the trap is rigidly supported in proper relation to the bottom wall, when the trap is assembled for use, by means of a collapsible skeleton supporting structure or frame comprising the two bails 7, which are pivotally held to opposite sides of the bottom wall of the trap as above described, and two U-shaped reach-rods or bail-connecting members 13. The transverse portions of the U-shaped rods 13 are pivotally held to opposite sides of the frame 10 of the top wall and the depending end portions 13ª thereof are adapted to engage in sleeves 14 rigidly held to the upper ends of the side arms of bails 7.

The two hinges 15 connecting each rod 13 to the frame 10 each preferably comprises a single piece of sheet metal bent or crimped into substantially the form of the numeral 8 in cross section, thus forming two parallel sleeves through which the wire frame member 10 and the wire rod 13 loosely extend. The socket members 14 are preferably formed in the same manner, that portion of the duplex sleeve through which the side arm of bail 7 extends being soldered, welded, or otherwise rigidly secured to the side arm of the bail, and the depending end portions 13ª of rods 13 frictionally engaging in the other portion of the duplex sleeve. The reach-rods 13 and bails 7 form a knockdown skeleton supporting frame for rigidly supporting the top and bottom walls of the trap in fixed relation when the trap is in use.

Four coiled springs 9 are provided, each of which normally tends to swing one of the side walls of the frame outwardly and downwardly. Each spring 9, as more clearly shown in Figs. 5 and 6 is coiled around one side of the wire frame 1 of the bottom wall of the trap and has one laterally extending end 9ª loosely engaging the rock arm 5 on the frame 3 of the adjacent side wall of the trap, the other laterally extending end 9ᵇ of the spring being secured to a side of frame 1 extending at right angles to the side of the frame around which the spring is coiled. Two cords or other flexible lines 16 extend from the two upper corners of each frame 3 of the side walls through eyes 12 on frame 10 of the top wall and are tied together at 17. The ends of the eight cords 16 are carried inwardly from the knots 17 to a point over the center of the top wall of the trap where they are tied together to form a loop 18 to which the lower end of a hoisting cord or cable 19 is secured.

The bait is placed on the bottom wall of the trap, and it will be obvious that if the trap is lowered to the bed of a body of water and cable 19 is then further paid out or slackened, the side walls of the trap will swing outwardly and downwardly so that crabs, or the like, may freely enter the trap. It will also be obvious that an upward pull on the cable 19 will first swing the side walls of the trap to closed position and then hoist the trap bodily. The distance between knots 17 and the outer ends of the cords 16 is preferably just sufficient to permit the side walls to swing downwardly into the same horizontal plane as the bottom wall of the trap to prevent the side walls from folding under the trap if it should be lowered upon a rock or uneven surface. In order to prevent accidental separation of members 13 from bails 7, owing to the tension of cords 16 during raising or lowering of the trap, I provide two sheet metal hooks or latches 20 which are pivotally held to opposite sides of frame 10 of the top wall of the trap and are adapted to be swung downwardly and inwardly under the transverse members of the bails 7, as more clearly shown in Fig 8.

The trap may be readily collapsed to form a flat package by disengaging hooks 20 and rods 13 from the bails; swinging the bails successively inwardly and downwardly upon the bottom wall of the trap; swinging the two side walls which are parallel with the bails successively inwardly and downwardly upon the bottom of the trap; folding the U-shaped reach-rods 13 upwardly and inwardly against the under side of the top wall of the trap and lowering the top wall upon the folded side walls; and then folding the two remaining side walls outwardly, downwardly and inwardly beneath the bottom wall of the trap, as shown in Figs. 3 and 4.

What I claim is:

1. A trap comprising rectangular top and bottom members, four rectangular side members hinged to the edges of the bottom member, a pair of bails having downwardly extending side arms hinged at their lower ends to opposite edges of the bottom member, a pair of reach-rods for separably connecting the bails to each other at points above the bottom member hinged to opposite edges of the top member and having laterally bent end portions, and means rigidly held to the bails provided with apertures for receiving the laterally bent end portions of the reach-rods.

2. A trap comprising rectangular top and bottom members, four rectangular side members hinged to the edges of the bottom member, a pair of bails having side arms hinged to opposite edges of the bottom member, a pair of reach-rods for separably connecting the bails hinged to opposite edges of the top member and having laterally bent end portions, means rigidly held to the bails provided with apertures for receiving the laterally bent end portions of the reach-rods, and latches carried by the top member for locking the transverse members of the bails to the top member.

3. A trap comprising rectangular top and bottom members, four rectangular side members hinged to the edges of the bottom member, a pair of bails having side arms hinged to opposite edges of the bottom member, a pair of reach-rods for separably connecting the bails hinged to opposite edges to the top member and having laterally bent end portions, means rigidly held to the bails provided with apertures for receiving the laterally bent end portions of the reach-rods, latches carried by the top member for locking the transverse members of the bails to the top member, guides on the top member, and flexible trap closing and hoisting means extending through the guides and secured to the side members.

4. A collapsible trap of the class set forth comprising top and bottom sections, a pair of skeleton supports hinged to one of said sections to fold thereupon, a pair of foldable braces hinged to the other section and provided with angular end portions, said supports being provided with sockets in which the end portions of the braces are adapted to engage to hold the supports in upright positions, side sections hinged to the bottom section, and means for swinging the side sections upwardly to close the trap.

5. A collapsible trap of the class set forth comprising a top section, a bottom section, side sections hinged to the bottom section to fold thereupon when the trap is collapsed and to swing toward and from the top section to close and open the trap when the trap is assembled, rigid members hinged respectively to the top and bottom sections to fold thereupon, the members on one section having telescoping connections with the members on the other section for forming a collapsible support for the top section.

In testimony whereof I hereunto affix my signature.

JOHN F. MASEK.